United States Patent Office 3,277,140
Patented Oct. 4, 1966

3,277,140
PREPARATION OF ALIPHATIC ISOCYANATES
Joseph J. Donovan, Swarthmore, and Kenneth F. Gosselin, Media, Pa., assignors to Air Products and Chemicals Inc., Philadelphia, Pa., a corporation of Delaware
No Drawing. Filed July 16, 1963, Ser. No. 295,537
3 Claims. (Cl. 260—453)

This invention relates to methods of making aliphatic isocyanates.

An aliphatic primary amine may be converted to the corresponding isocyanate by substituting a carbonyl group for the amino hydrogens. In several procedures employed industrially, phosgene is reacted with the primary amine group. As explained in Patent 2,640,846, an alkyl formamide (RNHCHO) is reacted with tertiary butylhypohalite to form an intermediate N-halo-formamide which is separated for subsequent dehydrohalogenation by heat treatment in the presence of a base (e.g., a tertiary amine) to form an alkyl isocyanate and the hydrohalide salt of the base.

Although there has been a long-standing demand for a flexible, adaptable method for converting an amine to isocyanate, and although many procedures formulated by prior workers have been described in the literature, organic chemists have remained dissatisfied with the methods available for such conversion of amine to isocyanate.

In accordance with the present invention, a lower aliphatic formamidohydrocarbon is dissolved in a system comprising somewhat more than two mols of a heterocyclic aromatic tertiary amine per mol of formamidohydrocarbon, and a halogen of the group consisting of chlorine, bromine and iodine is introduced into said system to provide somewhat more than one mol of halogen per mol of formamidohydrocarbon. The reaction mixture is heated to assure completion of the reaction. The halogen reacts with the amino hydrogen and the formyl hydrogen to convert the formamidohydrocarbon to an aliphatic isocyanate, and the hydrogen halide is bound to the heterocyclic amine. The aliphatic isocyanate having not more than 12 carbon atoms is separated from the reaction mixture. The hydrohalide salt of the tertiary heterocyclic amine may, if desired, be regenerated to provide halogen and tertiary amine for reuse in the process.

The invention is further clarified by consideration of a plurality of examples, illustrating specific embodiments for practice thereof.

Examples 1 to 8

Hexyl amine was converted to formamido hexane. A mixture of 50 g. (0.38 mol) of formamido hexane and 195 g. (1.5 mols) of quinoline was stirred in a 500 ml. flask during the slow addition of 29 ml. (87 g. or 1.1 mols) of bromine. The hydrogen atom on the carbon atom and the hydrogen atom on the nitrogen atom are removed by the halogen to form hydrohalide, which combines with the tertiary heterocyclic aromatic amine. After the slow addition of the bromine, heat was applied for an additional 45 minutes to reflux the mixture at about 183° C. Fractional distillation of the product permitted recovery of 26 g. n-hexyl isocyanate, amounting to 68.5% of the theoretical yield.

In a series of preparations following the same pattern, a satisfactory yield of n-hexyl isocyanate was identified in the reaction product from the halogenative dehydrogenation of formamido-hexane as indicated in Table I.

TABLE I

| Ex. No. | Halogen | Amine | Peak Temp., °C. | Comments |
|---|---|---|---|---|
| 2 | $Br_2$ | Quinoline | 120 | Dimethylformamide solvent. |
| 3 | NaOCl | do | | |
| 4 | $Br_2$ | do | 230 | Product distilled during reaction. |
| 5 | $Cl_2$ | do | 230 | |
| 6 | $I_2$ | do | 250 | |
| 7 | $Br_2$ | Pyridine | 80 | |
| 8 | $Br_2$ | do | 35 | 3 hours reflux using ether solvent. |

Although hexyl isocyanate was prepared and identified as a component in the product in each example, the peculiarities of the reaction were not fully understood. For example, neither triethyl amine nor trilauryl amine could be substituted for the aromatic heterocyclic tertiary amine, although in many other systems all such amines are equivalent. The formamido compounds of primary aromatic amines are not satisfactorily converted to aromatic isocyanate compounds by halogenative dehydrogenation. Only the manufacture of hydrocarbyl isocyanate having not more than 12 carbon atoms is contemplated by the present invention.

Examples 9 to 13

Aliphatic diisocyanates are sometimes employed in manufacturing polyurethane plastics. It is established by a series of preparations that hexamethylene diisocyanate can be prepared from 1,6-diformamido hexane, as indicated in Table II:

TABLE II

| Ex. No. | Halogen | Amine | Peak Temp., °C. | Reac., Hrs. | Comments |
|---|---|---|---|---|---|
| 9 | $Br_2$ | Quinoline | 120 | 1 | |
| 10 | $Br_2$ | Pyridine | 80 | 2 | |
| 11 | $Br_2$ | do | 80 | 2.5 | Benzene |
| 12 | $Br_2$ | do | 80 | 3.5 | solvent |
| 13 | $Br_2$ | do | 80 | 3.0 | employed. |

Especially satisfactory results were obtained in Example 13. The reaction mixture was allowed to cool overnight and filtered to remove pyridine hydrobromide. Substantially all of the benzene and pyridine volatilized under vacuum to provide a crude hexane, 1–6 diisocyanate.

Example 14

Alpha-alpha'diisocyanato-paraxylene, having a formula p-OCNCH$_2$C$_6$H$_4$CH$_2$NCO, is prepared by bubbling chlorine into a reaction mixture consisting essentially of 2.5 mols of pyridine, 2 mols of benzene, and 1 mol of alpha-alpha-diformamido-paraxylene, followed by heating the reaction mixture at reflux for one hour. Benzyl isocyanate and similar isocyanate compounds having aromatic groups remote from the isocyanato group are included within the scope of aliphatic isocyanates. The pyridine hydrochloride separated from the reaction mixture may be electrolytically regenerated to prepare by product hydrogen, pyridine, and chlorine for recirculation to the principal reaction zone.

Example 15

By a series of tests, the critical limits are established, whereby the present invention involves the requirements: that the isocyanate group be attached to an aliphatic carbon atom of a hydrocarbyl group; that the hydrocarbon group contain a sufficiently small number of carbon atoms that the resulting isocyanate has fewer than 12 carbon atoms; that each formamido group be sterically available and unobstructed, thus excluding reactants such as 3,4-diformamido, 2,2,5,5-tetramethyl hexane from operative reactants; that the tertiary heterocyclic amine be present in a molar quantity greater than twice that of the formamido group; that the mol ratio of halogen to formamido group be greater than one to one; that the lower aliphatic formamide be dehydrogenated by treatment with a readily liquified halogen (i.e., chlorine, bromine, iodine or mixtures thereof) in the presence of an excess of heterocyclic tertiary amine, followed by heating to assure completion of the reaction; and that the lower isocyanate be separated from the halide salt.

As noted in the examples, the reactants and products are hydrocarbyl (with the exception of the formamido and isocyanato groups respectively).

Various modifications of the invention are possible without departing from the scope of the appended claims.

The invention claimed is:

1. The method of preparing an organic hydrocarbyl isocyanate in which each isocyanato group is attached to an aliphatic carbon atom, which method consists essentially of: preparing a solution containing a tertiary aromatic heterocyclic amine and a compound having less than 12 carbon atoms and having at least one formamido group attached to a sterically available aliphatic carbon atom of a hydrocarbyl group; adding to said solution a halogen of the group, chlorine, bromine, or iodine, whereby the formamido group is halogenatively dehydrogenated to form the isocyanato group and the hydrogen halide formed is bound as the salt of said amine; heating the reaction mixture at a temperature in the range from about 35° C. to about 250° C.; and separating the isocyanate compound from the hydrohalide salt of the amine.

2. The method of preparing n-hexyl isocyanate which includes the steps of: preparing a solution consisting essentially of a mononuclear aromatic hydrocarbon serving as an inert solvent, a predominant molar amount of aromatic heterocyclic tertiary amine, and the formamide of n-hexane; slowly adding to said solution a quantity of halogen of the group, chlorine, bromine, or iodine, whereby n-hexyl isocyanate is formed by halogenative dehydrogenation, and whereby the hydrohalide salt of the aromatic heterocyclic tertiary amine is formed; subjecting the reaction mixture to external heat at a temperature in the range from about 35° C. to about 250° C. to complete the interaction of the halogen and formamide; and separating n-hexyl isocyanate from the reaction mixture.

3. The method of preparing a hydrocarbyl isocyanate compound containing a plurality of isocyanato groups each attached to a sterically available aliphatic carbon atom, said hydrocarbyl isocyanate having less than 12 carbon atoms, which method consists essentially of: halogenatively dehydrogenating an organic compound containing a plurality of formamido groups each attached to a sterically available aliphatic carbon atom of a hydrocarbyl group by preparing a solution consisting essentially of an inert solvent, an aromatic heterocyclic tertiary amine, and an organic compound having a plurality of formamido groups each attached to a sterically available aliphatic carbon atom of a hydrocarbyl group, adding to said solution halogen of the group, chlorine, bromine, or iodine, and heating the solution at a temperature in the range from about 35° C. to about 250° C.; and separating the hydrocarbyl isocyanate from the products of the reaction.

References Cited by the Examiner

UNITED STATES PATENTS

| | | | |
|---|---|---|---|
| 2,640,846 | 6/1953 | Hurwitz et al. | 260—453 |
| 3,099,673 | 7/1963 | Kuhle | 260—453 |

CHARLES B. PARKER, *Primary Examiner.*

DALE R. MAHANAND, *Assistant Examiner.*